(12) United States Patent
Onishi et al.

(10) Patent No.: US 7,297,271 B2
(45) Date of Patent: Nov. 20, 2007

(54) TITANIUM POWDER SINTERED COMPACT

(75) Inventors: Takashi Onishi, Amagasaki (JP);
Tadashi Ogasawara, Amagasaki (JP);
Munetoshi Watanabe, Amagasaki (JP);
Masamichi Kato, Amagasaki (JP)

(73) Assignee: Sumitomo Titanium Corporation, Hyogo (JP)

( * ) Notice: Subject to any disclaimer, the term of this patent is extended or adjusted under 35 U.S.C. 154(b) by 0 days.

(21) Appl. No.: 11/501,733

(22) Filed: Aug. 10, 2006

(65) Prior Publication Data

US 2006/0266698 A1 Nov. 30, 2006

Related U.S. Application Data

(63) Continuation of application No. 10/468,058, filed as application No. PCT/JP02/01332 on Feb. 15, 2002, now abandoned.

(30) Foreign Application Priority Data

| Feb. 16, 2001 | (JP) | ................. 2001-40161 |
| Feb. 23, 2001 | (JP) | ................. 2001-48564 |
| Apr. 19, 2001 | (JP) | ................. 2001-121356 |
| Apr. 20, 2001 | (JP) | ................. 2001-122645 |

(51) Int. Cl.
*B01D 24/00* (2006.01)
*C22C 1/04* (2006.01)
*H01M 4/00* (2006.01)
*B22F 3/00* (2006.01)

(52) U.S. Cl. ................. 210/510.1; 210/497.2; 210/498; 55/523; 419/2; 419/23; 419/38; 419/43; 428/546; 428/547; 429/45

(58) Field of Classification Search ................. None
See application file for complete search history.

(56) References Cited

U.S. PATENT DOCUMENTS

| 4,894,158 A | | 1/1990 | Morita et al. | |
| 4,964,992 A | * | 10/1990 | Goldsmith et al. | .... 210/500.36 |
| 5,019,311 A | | 5/1991 | Koslow | |

FOREIGN PATENT DOCUMENTS

| JP | 07 268515 A | 10/1995 |
| JP | 8-89731 | 4/1996 |
| JP | 80-89731 | 4/1996 |
| JP | 10-237504 | 9/1998 |
| JP | 2002-66229 | 3/2002 |

* cited by examiner

*Primary Examiner*—Krishnan S. Menon
(74) *Attorney, Agent, or Firm*—Morrison & Foerster LLP

(57) ABSTRACT

Provided are a porous sintered compact suitable for a filter, a power feeder in a polymer electrolyte membrane type water electrolyzer, a current collector in a solid polymer fuel cell and in addition a liquid dispersion plate, especially an ink dispersion plate for an ink jet printer ink and the like. A titanium powder sintered compact made of a plate-like porous compact is obtained by sintering spherical powder made of titanium or a titanium alloy produced by means of a gas atomization method. A void ratio in the range of from 35 to 55% is realized by filling without applying a pressure and sintering without applying a pressure.

3 Claims, 9 Drawing Sheets (a)

(b)

10 μm

10 μm

TITANIUM POWDER SINTERED COMPACT

CROSS-REFERENCE TO RELATED APPLICATION

This application is a continuation application of U.S. Ser. No. 10/468,058, filed Feb. 2, 2004, now abandoned, which is a 371 of PCT/JP02/01332, filed Feb. 15, 2002 the entirety of which are incorporated herein.

TECHNICAL FIELD

The present invention relates to a porous titanium powder sintered compact employed as a filter, a power feeder in a polymer electrolyte membrane type water electrolyzer, a current collector in a solid polymer fuel cell and in addition a liquid dispersion plate, especially an ink dispersion plate for an ink jet printer and the like.

BACKGROUND ART

A metal powder sintered compact has been adopted as one of filters employed in the chemical industry, the polymer industry, the chemicals industry and others. As metals herein, there have been used generally brass, stainless steel and, recently, titanium.

Titanium is greatly excellent in corrosion resistance, acid proofness and the like as compared with stainless steel, but on the other hand, extremely poor in moldability. Hence, generally, a titanium sintered filter has been fabricated according to a method in which hydrogenation/dehydrogenation titanium powder accepted as having a comparatively good moldability is molded with a die press, followed by sintering, and furthermore, a method disclosed in JP A 1995(H7)-238302 uses titanium sponge powder comparatively good in moldability similarly to hydrogenation/dehydrogenation powder.

Such titanium sintered filters have started finding applications thereof to, for example, highly corrosion resistant filters for a carrier gas inlet section of a gas chromatography apparatus, production of food such as a liquid condiment, and a liquid pigment.

Filters well used in various application fields have been faced a demand for maximum pore diameters adapted for respective purposes of usage. The term, "a maximum pore diameter" is used as an index expressing the size of a particle removable by a filter, wherein with the same value of a maximum pore diameter, it may be considered that filters having respective pore shapes different from each other can remove particles having at least the same diameter. A filter with the smaller pressure drop is more requested among filters with the same maximum pore diameter. For example, as the carrier gas inlet section filter for a gas chromatography apparatus, a filter has been desired that is not only excellent in corrosion resistance but also especially has a maximum pore diameter of 70 µm or less and a smaller pressure drop.

In a titanium sintered filter using hydrogenation/dehydrogenation powder or titanium sponge powder, however, there exists a constraint to disable a pressure drop to be reduced to a small value in a case where a maximum pore diameter is adjusted to 70 µm or less.

A titanium sintered filter using hydrogenation/dehydrogenation powder or titanium sponge powder has another problem that the filter is very hard and fragile without flexibility; therefore it is easy to be broken if being thin and difficult to fabricate the filter large in area. In addition, since bending is difficult at room, temperature, a product cannot be fabricated by bending, causing a problem of a high fabrication cost except for a plate-like shape.

For example, a case arises where there is requested a titanium sintered filter of the shape of a cylinder, of the order of 40 mm in diameter (with a radius of curvature of 20 mm), whereas since it is impossible to bend a titanium sintered compact in the form of a flat plate into the form of a cylinder at room temperature, a necessity arises for working by cold isostatic pressing called CIP for short as described in JP. No. 2791737, thereby increasing in fabrication cost cannot be avoided.

Even with hydrogenation/dehydrogenation titanium powder and titanium sponge powder, moldability is inferior to that of stainless steel. Hence, it is difficult to mold the titanium powders into shapes except for a thin flat plate. Therefore, it is also difficult to directly mold a filter in the shape of a cylinder without resorting to bending process.

That is, in a case where a sintered compact in the shape of a cylinder is fabricated by press molding using hydrogenation/dehydrogenation titanium powder or titanium sponge powder, a press force in a direction of height does not effectively act, which results in difficulty in molding a middle portion in the direction of height; therefore a cylinder with a large height cannot be produced though a low-profile ring can be produced. While a cylinder with a large height can be fabricated by cold isostatic pressing called CIP instead of a press, a high cost is encountered, making CIP improper as a fabrication method for a sintered filter. Therefore, while it is imagined to stack rings along the central axis direction to weld the rings, needless to say that thus fabricated sintered filter is much higher in cost as compared with a sintered filter fabricated by press molding stainless steel powder.

Incidentally, a method is described in JP No. 2791737 in which stainless steel powder is subjected to cold isostatic pressing too fabricate a sintered filter in the shape of a cylinder.

As a different problem of a titanium sintered filter using hydrogenation/dehydrogenation titanium powder or titanium sponge powder, low reverse-washing property arises. That is, sizes and shapes of cavities are randomly distributed in titanium sintered filters made of each powder. While a filter of this kind is used over a long term repeating reverse-washing, if sizes and shapes of cavities are random, solid matter trapped therein are not sufficiently removed even with reverse-washing. Hence, the problem of low reverse-washing reproducibility has remained.

It is described in JP No. 2791737 that, as for a stainless steel filter, a diameter of a cavity is increased in a direction from the front surface to the rear surface of a stainless steel sintered filter in order to enhance reverse-washing reproducibility of a metal powder sintered filter. To be concrete, a slurry obtained by dispersing fine powder into a binder resin solution is applied on the surface of a porous compact obtained by presintering and thereafter, sintering of the porous compact is conducted, thereby forming a skin layer with fine pores on the surface of the porous compact.

In such a multilayer structure, since almost all solid matter in a treated liquid is trapped in the skin layer with fine pores formed therein and no foreign matter is trapped in cavities inside the base layer, the solid matter trapped and accumulated in the skin layer is easy to be removed by reverse-washing. On the other hand, the following problem arises however.

Stainless steel is inferior to titanium in corrosion resistance. Furthermore, stainless steel powder used here is composed of irregularly shaped particles produced by a water atomization technique; therefore, sizes and shapes of cavities in a sintered compact are random in not only the base layer but also the skin layer. Besides, since the skin layer does not receive the action of press molding though the base layer receives the action of press molding, sizes and shapes of fine pores in the skin layer are more random than in the base layer. For this reason, solid matter remains in the skin layer after reverse-washing, thereby disabling reverse-washing reproducibility as high as expectation. In addition, since a void ratio of the skin layer receiving no press molding is largely different from that of the base layer receiving press molding, there also arises a risk that permeability of a treated liquid is lowered.

A sintering compact is also used as a power feeder in a water electrolytic cell producing hydrogen and oxygen using a polymer electrolytic film. Concrete description will be given of the water electrolytic cell; a construction is generally employed in which a unit is formed by placing power feeders on both surfaces of a film electrode laminates formed by laminating catalyst layers onto both surfaces of the polymer electrolyte film, multiple of units are stacked and electrodes are provided on both sides thereof.

The power feeders herein are made each of a porous conductive plate and placed in close contact with an adjacent film electrode laminates. Why a porous conductive plate is used as a power feeder is that a current is required to flow through, that water is required to be supplied for a water electrolytic reaction and that gas generated in the water electrolytic reaction is quickly expelled out.

A structure of a fuel cell using a polymer electrolytic film is also the same as that of the water electrolyzer and porous conductive plates are placed on both surfaces of a film electrode laminates. In the case of a fuel cell, since an electric power is obtained with hydrogen as fuel, the porous conductive plates are called current collectors.

As to a porous conductive plate such as a power feeder in such a polymer electrolyte membrane type water electrolyzer or a current collector in such a solid polymer fuel cell, titanium have been studied because of a necessity for characteristics enabling a material to be used in an oxidizing atmosphere, and among titanium with actual natures and conditions, especially a sintered compact has drawn attention since a surface is smooth, it is difficult to damage an adjacent film electrode laminates and a proper void ratio can be attained with ease.

As porous conductive plates made of a titanium sintered compact, there are exemplified: a titanium powder sintered plate obtained by sintering powder obtained by crushing titanium sponge or powder produced by pulverizing titanium sponge by hydrogenation and dehydrogenation thereof; a titanium fiber sintered plate obtained by compression molding titanium fibers to sinter the preform; and a titanium fiber sintered plate on a surface of which a plasma sprayed layer of metallic titanium is formed, the last of which is disclosed in JP A 1999(H11)-302891.

A porous conductive plate made of a prior art titanium sintered compact described above, however, has the following problems.

Though a titanium powder sintered compact has an advantage that it is smooth on surfaces thereof and gives no damage on an adjacent film electrode laminates, the sintered compact has a fatal restraint that it is poor in press moldability and easily broken; therefore, it cannot be fabricated with a small thickness and a large area. On the other hand, though a titanium fiber sintered plate is good in moldability and can be produced with a small thickness and a large area, it has acute angled protrusions and depressions on surfaces thereof with large spacings between fibers. Therefore, if titanium fiber sintered plates are brought into press contact with an adjacent film electrode laminates, there is a high risk to damage the film electrode laminates. Furthermore, there remains a problem to increase a contact resistance between the titanium fiber sintered plate and the film electrode laminates.

In contrast to the sintered compacts described above, a titanium fiber sintered plate disclosed in JP A 1999(H11)-302891 is a sintered plate in which a plasma sprayed layer of metallic titanium is formed on a surface of the titanium fiber sintered plate to thereby cancel acute angled protrusions and depressions, and large spacings between fibers, and can be said to be excellent in moldability thereof and contactability between the sintered plate and the film electrode laminates.

Since in addition to requirement of an extra cost due to plasma spraying, avoid ratio and surface profiles of a titanium fiber sintered plate are different from those of a plasma sprayed titanium layer on the surface of the plate, an electric resistance increases at a bonding interface therebetween, leading to an electric resistance of a porous conductive plate higher than to be expected from an apparent void ratio. As a result, in a water electrolytic cell used at a high current density, for example, in the range of from 1 to 3 $A/cm^2$, a large voltage drop results. Needless to say that such a voltage drop is not at all allowed in a fuel cell.

Moreover, a large change in void ratio at a bonding interface leads to a worry to adversely influence on permeability of a gas and a liquid.

On the other hand, as an ink dispersion plate for a large ink jet printer, there has been requested a porous plate of, for example, a thickness of as thin as 2 mm or less and an area of as large as 200 mm×100 mm or more. This porous plate requires a small variation in void ratio from a nature of this kind. As such an ink dispersion plate, there has been used a sintered plate made of irregular shaped powder of stainless steel.

As the recent trend, a demand has started to be generated on a porous plate more excellent in corrosion resistance than a sintered plate of stainless steel powder, for which it is considered to use titanium powder more excellent in corrosion resistance than stainless steel.

Though titanium in greatly excellent in corrosion resistance and acid proofness as compared with stainless steel, it is extremely poor in moldability to the contrary. Hence, a general fabrication method for a titanium sintered plate has been thought to be such that hydrogenation/dehydrogenation titanium powder, which has been accepted to be comparatively good in moldability, is molded with a die press, followed by sintering the preform and furthermore, another fabrication method is also described in JP A 1995(H7)-238302 in which there is used titanium sponge powder, which is comparatively good in moldability, similar to the case of hydrogenation/dehydrogenation titanium powder.

Moreover, a different method is described in JP A 1996 (H8)-170107 in which a metal powder sintered plate uniform in void ratio is fabricated by HIP.

The present inventors tried a procedure in which hydrogenation/dehydrogenation titanium powder or titanium sponge powder is molded with a die press to sinter the preform for the purpose to fabricate a dispersion plate uniform in void ratio with a thickness as thin as 2 mm or less and an area as large as 200 mm×100 mm or more, and since the dispersion plate was excessively thin, it was broken after press, having disabled fabrication thereof.

The present inventors tried fabrication of the dispersion plate described above by HIP only to find difficulty. The reason for the difficulty is that a porous plate after sintering was not able to be separated from a capsule maintaining a shape of a sintered compact during HIP. Moreover, it is also difficult to select a material of which the capsule is made, which together with the above reason, causes a fabrication cost to be raised to a very high value.

The present invention has been made in light of such circumstances and it is a first object to provide a titanium powder sintered compact excellent in corrosion resistance, having a small maximum pore diameter, and showing a performance of a small pressure drop during usage as a sintered titanium filter.

It is a second object of the present invention to provide a titanium powder sintered compact excellent in bending.

It is a third subject of the present invention to provide a cylindrical porous compact low in fabrication cost despite using titanium powder, and excellent in reverse-washing reproducibility while being used as a powder sintered filter.

It is a fourth object of the present invention to provide a metal sintered filter excellent in corrosion resistance and reverse-washing reproducibility.

It is a fifth object of the present invention to provide a porous conductive plate excellent not only naturally in moldability, but also in surface smoothness even without coating like plasma spraying, and in addition, easy in production and excellent in economy.

It is a sixth object of the present invention to provide a highly corrosion resistant porous plate capable of economically satisfying a condition to realize a uniform void ratio and a small thickness as required by an ink dispersion plate for use in a large ink jet printer.

DISCLOSURE OF THE INVENTION

A prior art titanium powder sintered filter was fabricated with hydrogenation/dehydrogenation titanium powder or titanium sponge powder. This is mainly because particles included in powder are in irregular shapes; therefore the powder is excellent in press moldability. In a case where particles are irregular in the shapes, a cavity diameter is varied only if a mold is filled with powder; therefore, a necessity arises for making a cavity diameter uniform by press molding, which also makes press molding indispensable.

Such a titanium powder sintered compact is, however, very poor in bendability as described above. Furthermore, since hydrogenation/dehydrogenation titanium powder or titanium sponge powder is composed of particles in irregular shapes, a cavity diameter is made uniform at a comparatively small level by press molding, thereby causing press moldability to be comparatively good. It is difficult to mold the powder into a cylinder with a large height, however, and reverse-washing reproducibility is also poor when the titanium sintered compact is used as a filter. Even with press molding applied, uniformity of a cavity diameter is still insufficient and a skin layer receiving no press molding is conspicuously non-uniform in cavity diameter as described above.

In order to solve these problems, the present inventors focused attention on spherical gas atomized titanium powder. Spherical gas atomized titanium powder is powder of titanium or a titanium alloy produced by means of a gas atomization method and individual particles are of a sphere with a smooth surface since the individual particles are formed by solidification during the time when melt spray of titanium or a titanium alloy is flying. Furthermore, particle diameters can be very much reduced down to as small as 100 µm or less on average and screening is easily applied for classification by particle diameter.

Such spherical gas atomized titanium powder is excellent in fluidity and has a good contactability between particles; therefore, a uniform and sufficient packing density can be attained in the powder filling a sintering vessel without applying a pressure thereto. Then, by sintering the powder in the vessel, a porous compact with a high mechanical strength is fabricated without press molding and in thus fabricated porous compact, adjacent spherical particles are fused to each other at contact points and the fused points are uniformly distributed in the bulk thereof; therefore, it was found that in a case where a porous compact was comparatively small in thickness, excellency in bending characteristic was assured. Furthermore, a sintered compact in any shape and any size including a cylinder is fabricated without press molding and thus fabricated sintered compact has not only a sufficient strength but a uniform cavity therein with certainty and furthermore, a shape of each cavity is of a smooth spherical surface. In addition, by changing diameters of particles in raw material powder, that is by adjusting diameters of particles in use, diameters of cavities are controlled in a wide range with a constant void ratio. A void ratio in a porous compact thus obtained is in the range of from 35 to 55% without applying a pressure to powder in a sintering vessel.

A titanium powder sintered compact of the present invention has reached its completion based on findings described above, and is characterized by that the sintered compact is a plate-like porous compact obtained by sintering spherical gas atomized titanium powder and a void ratio of the porous compact is in the range of from 35 to 55%.

In a sintered titanium filter made of the titanium sintered compact, a maximum pore diameter can be controlled in the range of from 3 to 70 µm and a pressure drop can be restricted to a small value. Note that a void ratio of the porous compact, though detailed later, is not limited in the range of from 35 to 55% in actual fabrication thereof. This is because a void ratio in the range of from 35 to 55% is especially suited for a variety of applications and, at the same time, obtained with ease in fabrication thereof.

A titanium powder sintered compact of the present invention can acquire so excellent a bending characteristic that the sintered compact can be bent into a cylinder by restricting a thickness of the porous compact to 500 µm or less. If a thickness of the porous compact is larger than 500 µm, bending at room temperature is impossible. In a case where powder with particles in irregular shapes such as hydrogenation/dehydrogenation titanium powder, titanium sponge powder or the like is used instead of spherical gas atomized titanium powder, uniformity of a cavity diameter cannot be achieved in molding without applying a pressure to the powder even if the plate thickness is 500 µm or less. What's worse, since fused points between particles are distributed in non-uniformity, there locally arise portions with shortage of strength, thereby disabling bending at room temperature.

The plate thickness is especially preferably 100 µm or less from the viewpoint of bendability at room temperature. It is preferable that the thinner the lower limit of the plate thickness is, the better it is from the viewpoint of bendability at room temperature, while in a case where a ratio of a particle diameter/a plate thickness is excessively large, for example in a mono-particulate layer, a void ratio is larger than the range of from 35 to 55%, which is preferably applied to a metal powder sintered compact. Therefore, the plate thickness is preferably three times an average diameter of particles in powder in use.

While a shape of a titanium powder sintered compact is basically a flat plate, the sintered compact may assume one of other shapes, for example a curved plate or the like and it is naturally possible to bend a flat plate into a plate with a semicircular shape in section, or a U letter in section, to work a flat plate into a corrugated plate, or to bend a flat plate into a cylinder according to a kind of application, without imposing any limitation on a particular shape in a molding stage or a usage stage.

A cylindrical porous compact of the present invention is a titanium powder sintered compact described above and formed by sintering spherical gas atomized powder directly into a cylinder, and for example, a cylindrical titanium powder sintered filter can be provided as a product large in height and good reverse-washing reproducibility and fabricated at a low cost without using a press.

A metal sintered filter of the present invention is of a titanium powder sintered compact, in a titanium porous structure of which, a cavity diameter is stepwise increased from one surface thereof to the other surface, and which not only is excellent in reverse-washing reproducibility, but can also have a uniform void ratio independently of increase in cavity diameter.

That is, particle diameters of spherical gas atomized titanium powder affect cavity diameters. By increasing, stepwise, a particle diameter of used powder from one surface of a filter to the other surface, a cavity diameter can be stepwise increased, thus enabling a layered structure in which plural porous layers are stacked in ascending order of cavity diameter increasing stepwise. Since even in a case where particle diameters of spherical powder changes to another ones, a void ratio in a sintered compact is fundamentally constant without a pressure applied to the powder in a sintering vessel, cavity diameters can be changed without changing a void ratio. If a sintering temperature is changed, contact areas between particles also become different, thereby controlling cavity diameters and in turn, controlling a void ratio as well.

FIGS. 1(a) and 1(b) are image views showing a difference in structure between a prior art example metal sintered filter and an example metal sintered filter of the present invention, respectively.

In the prior art example shown in FIG. 1(a), there is used powder including irregular shaped titanium particles 1 such as hydrogenation/dehydrogenation titanium powder, titanium sponge powder or the like as titanium powder, wherein finer particles are used in a layer closer to the surface thereof and a cavity diameter is smaller in a layer closer to the surface thereof. In this case, press moldability is comparatively good and a void ratio is made uniform by press molding, while a degree of the uniformity in void ratio is insufficient. Since shapes of cavities 2 formed between titanium particles 1 are not made of smooth curved surfaces, it is difficult to remove solid matter.

In contrast to this, in the example of the present invention shown in FIG. 1(b), there is used powder including spherical titanium particles 1 produced by means of a gas atomization method as titanium powder, wherein finer particles are used in a layer closer to the surface thereof and a cavity diameter is smaller in a layer closer to the surface thereof, whereas a void ratio is constant even without applying a pressure. Since shapes of cavities 2 formed between titanium particles 1 are made of smooth curved surfaces each of a spherical surface, it is easy to remove solid matter from the cavities 2.

The present inventors, furthermore, fabricated, on a trial base, sintered plates imagined as a power feeder in a polymer electrolyte membrane type water electrolyzer or a current collector in a solid polymer fuel cell using spherical gas atomized titanium powder and features, characteristics thereof and the like were evaluated. As a result, the following facts were made clear.

Spherical gas atomized titanium powder is excellent in fluidity and the powder in a sintering vessel fills the vessel at a sufficient density even without applying a pressure. If sintering the powder, (1) a sufficient mechanical strength is ensured in a case of a shape even with a thin and large area, (2) void ratios preferable as a power feeder or a current collector can be obtained with simplicity without any special operation applied, and (3) a surface is high in smoothness and no fear arises of being brought into close contact with an adjacent film electrode laminates to damage it even without coating by plasma spraying or the like. Therefore, there are avoided a voltage drop due to increase in resistance at a bonding interface and an adverse influence on permeabilities of a gas and a liquid.

That is, a sintered compact using spherical gas atomized titanium powder is not applied even with a pressure in the course of fabrication nor applied with surface coating after the fabrication, but shows a very excellent aptitude shown in terms of both performance and economy as a power feeder in a polymer electrolyte membrane type water electrolyzer or a current collector in a solid polymer fuel cell.

A porous conductive plate of the present invention has been developed based on such findings and is a titanium powder sintered compact and used as a power feeder in a polymer electrolyte membrane type water electrolyzer or a current collector in a solid polymer fuel cell.

In contrast, with a prior art titanium sintered plate, it was difficult to fabricate a thin and large area sintered plate as requested in application to an ink jet dispersion plate for use in an ink jet printer as described above. Moreover, the present inventors conducted a trial in which hydrogenation/dehydrogenation titanium powder was not applied with die pressing prior to sintering and sintered without a pressure applied thereto, but with the result of obtaining no uniformity in void ratio required in a dispersion plate.

In order to solve this problem, the present inventors focused attention again on spherical gas atomized titanium powder. Since spherical gas atomized titanium powder is very excellent in fluidity and good in contactability between particles, a uniform and sufficient packing density can be attained by filling a sintering vessel with the powder without a pressure applied to the powder in the sintering vessel. By sintering the powder in the sintering vessel, a porous compact in the shape of a thin plate with a high mechanical strength was fabricated without press molding and in addition, in thus fabricated thin plate, adjacent spherical particles were fused to each other in point contacts and the fused points were distributed uniformly; therefore, it was found that a variation in void ratio in a plate surface was also small.

A highly corrosion resistant porous plate of the present invention has been completed based on such findings and made of a titanium powder sintered compact described above and a ratio T/S of a plate thickness T (in mm) of the porous compact to an area S of the porous compact (in mm$^2$) is controlled to be 1/10000 or less.

If the ratio T/S is in excess of 1/10000, a porous plate excellent in uniformity in void ratio can be fabricated by HIP but without using spherical gas atomized titanium powder. A production cost thereof is highly expensive, however. A highly corrosion resistant porous plate of the present invention is significant because of being provided at a very low cost with uniformity in void ratio, but without using even press molding, let alone HIP naturally not used.

A variation in void ratio in a surface of the plate is preferably 3% or less in standard deviation. A porous plate with the uniformity inferior thereto can be fabricated by a combination of powder including particles in irregular shapes and press molding. The lower limit is especially not defined since a smaller variation in void ratio is better. In the present invention, the variation can be 3% or less and can also be 1% or less.

As spherical gas atomized titanium powder used in a titanium powder sintered compact of the present invention, three kinds, for example, classified by a range of particle diameters are sold on the market. That is, the three kinds include fine particles of 45 µm or less in diameter, coarse particles in the range of from 45 to 150 µm in diameter and coarser particles 150 µm or more in diameter, and the fine particles has an average particle diameter of about 25 µm and the coarse particles has an average particle diameter of about 80 µm.

An average particle diameter of spherical gas atomized titanium power is preferably selected in the range of 150 µm or less. If the average particle diameter exceeds 150 µm, spacings between fused points between particles are excessively wide; therefore, a possibility of breakage in bending is high. A void ratio, for example, in a case where a titanium powder sintered compact of a plate thickness in the vicinity of 500 µm is larger than the range of from 35 to 55% preferably applied to a metal powder sintered filter. A relationship between a plate thickness and fused points between particles are desirably such that two or more fused points are present within a plate thickness range. The lower limit is not specifically defined since there is a tendency that workability is improved with decrease in particle diameter.

A plate thickness of a porous compact, that is a titanium powder sintered compact of the present invention is 500 µm or less from the viewpoint of bendability described above and it is preferable for the thickness to be 100 µm or less in consideration of bendability at room temperature.

A void ratio can be attained in the range of from 35 to 55% in a case where spherical gas atomized titanium powder sold on the market is used even without applying a pressure to the powder in filling it in a vessel or sintering. According to an investigation having been conducted by the present inventors, the void ratios in the range are preferable for use in a metal powder sintered filter.

Particle diameters of spherical gas atomized titanium powder for used in a cylindrical porous compact of the present invention is not specifically limited to those in any particular diameter range and no problem arises with a level of commercial powder of this kind, while it is difficult to produce extremely fine particles industrially with a good yield even according to a gas atomization method. In a case where coarse particles are used to fabricate a thin porous compact, a contact area between particles in titanium powder relative to a thickness thereof is smaller, so there arises a worry of shortage of strength. This is because in a case where coarse particles are used in fabrication of a thin porous compact, the number of contact points between particles in titanium powder is small. On the other hand, if a contact area between particles in titanium powder is increased so as to supplement a decrease in the number of contact points to thereby improve the strength, a void ratio cannot fall inside the range of from 35 to 55%. Therefore, particle diameters are preferably in the range of from 10 to 150 µm on average.

A void ratio of a cylindrical porous compact can be attained in the range of from 35 to 55% using spherical gas atomized titanium powder sold on the market even without a pressure applied in filling and sintering. According to an investigation having been conducted by the present inventors, void ratios in the range are preferable for use in a metal powder sintered filter.

A void ratio can be strictly controllable by adjustment of a sintering temperature, selection of particle diameters, adjustment of a pressure and the like. In a general tendency, with a higher sintering temperature, a contact area between particles increases and a cavity diameter decreases, resulting in reduction in void ratio. Likewise, as a particle diameter becomes smaller, a sinterability is improved with the same sintering temperature held and as a result, a cavity diameter gets smaller, leading to a tendency of decreasing a void ratio. If a pressure is applied in filling powder into a vessel and sintering of the powder, a void ratio is reduced.

A cavity diameter can be controlled, similarly to the case of a void ratio, by adjustment of a sintering temperature, selection of particle diameters and the like. In a cylindrical porous compact of the present invention, a cavity diameter is made uniform without applying a press because of excellency in fluidity of spherical gas atomized titanium powder. With particle diameters made more uniform, uniformity in cavity diameter is further promoted. Anyway, specifications of a product is substantially determined by specifications of raw material powder, which makes fabrication of the cylindrical porous compact simple.

A shape and size of a porous cylinder are properly determined by a shape and size of a product such as a filter to be fabricated and in a case of natural filling without pressing, a shape and size of a product is governed by an inner shape and size of a sintering vessel.

Note that in JP No. 2791737 described above, the use of spherical gas atomized powder is described, while the spherical powder is used not in formation of a base section in the shape of a cylinder but in formation of a fine powder layer coated on the surface of the base section, wherein the base section is fabricated by sintering powder including particles of irregular shapes into a cylinder by cold isostatic pressing.

Cavity diameters are important in a metal sintered filter of the present invention. Cavity diameters are preferably selected in the range of from 3 to 70 µm. That is, while in a highly corrosion resistant metal sintered filter, cavity diameters are desirably 70 µm or less in consideration of filterabilty, spherical gas atomized powder of an average particle diameter of 10 µm or less is required to be used in order to obtain cavity diameters of 3 µm or less, leading to a high fabrication cost.

A void ratio in the range of from 35 to 55% can be attained by using spherical gas atomized titanium powder sold on the market without applying a pressure to the powder in filling and sintering. According to an investigation having been conducted by the present inventors, the void ratios in the range are preferable in a metal powder sintered filter.

No specific limitation is placed on a range of particle diameters of spherical gas atomized titanium powder, and the powder of this kind at an off the shelf level described above can be non-problematically used, whereas extremely fine powder is difficult in industrial production even according to a gas atomization method with a good yield. On the other hand, a shortage of strength is worried in a thin porous compact using coarse particles since a contact area of particles of titanium powder is small relative to a thickness of the thin porous compact. Therefore, particle diameters are preferably selected in the range of from 10 to 150 µm on average so as to adapt for required cavity diameters.

No specific limitation is placed on a range of particle diameters of spherical gas atomized titanium powder for use in a porous conductive plate of the present invention and the powder of this kind at an off the shelf level is non-problematically used, whereas extremely fine powder is difficult in industrial production even according to a gas atomization method with a good yield. On the other hand, a shortage of strength is worried in a thin porous compact using coarse particles since a contact area of particles of titanium powder is small relative to a thickness of the thin porous compact. Therefore, particle diameters are preferably selected in the range of from 10 to 150 µm on average.

The range of from 35 to 55% in void ratio of a porous conductive plate can be attained by using spherical gas atomized titanium powder scold on the market without applying a pressure in filling and sintering. According to an investigation having been conducted by the present inventors, the range of the void ratio is preferable in consideration of electrical and mechanical properties of a porous conductive plate made of a titanium powder sintered compact. Note that adjustment of a void ratio so as to be 35% or less can also be realized by applying a pressure in filling and sintering and selecting other sintering conditions.

A void ratio can be controllable by adjustment of a sintering temperature, selection of particle diameters, adjustment of a pressure and the like. In a general tendency, with a higher sintering temperature, a contact area between particles increases, resulting in reduction in void ratio. Likewise, as a particle diameter becomes smaller, a contact area between particles increases, leading to a tendency of decreasing a void ratio. If a pressure is applied in filling and sintering, a void ratio decreases. As particle diameters are larger relative to a thickness of a porous conductive plate, there arises a tendency of increasing a void ratio.

With combinations of parameters or conditions described above adopted, a void ratio is controlled arbitrarily in a comparatively wide range. Note that an increase and decrease in void ratio to extremes become causes for degradation of reception/supply efficiency of water and gas in a reaction and shortage of a strength of a porous conductive plate.

A size of a porous conductive plate is properly selected depending on a size of a power feeder or a current collector to be fabricated.

An average particle diameter D of spherical gas atomized titanium powder for use in a highly corrosion resistant porous plate of the present invention is preferably 150 µm or less. If the average particle diameter exceeds 150 µm, cavity diameters grow large, so a dispersion effect is difficult to be attained. No specific limitation is imposed on the lower limit of an average particle diameter D since the smaller an average particle diameter is, the better it is.

A thickness T of a porous plate is preferably 2 mm or less and more preferably 1 mm or less in order to reduce a pressure drop.

A void ratio is preferably in the range of from 35 to 55%. This is because if a void ratio is less than 35%, a problem arises that a dispersibility is degraded and a pressure drop is increased. The upper limit is reasonably 55% in consideration of geometry in a case where spherical particles are used as powder.

A highly corrosion resistant porous plate of the present invention is especially preferable as an ink dispersion plate for an ink jet printer small in thickness and large in area, requiring a uniform void ratio and a high corrosion resistance, and greatly contributes to reduction in fabrication cost for the dispersion plate.

BEST MODE FOR CARRYING OUT THE INVENTION

Figure 1:
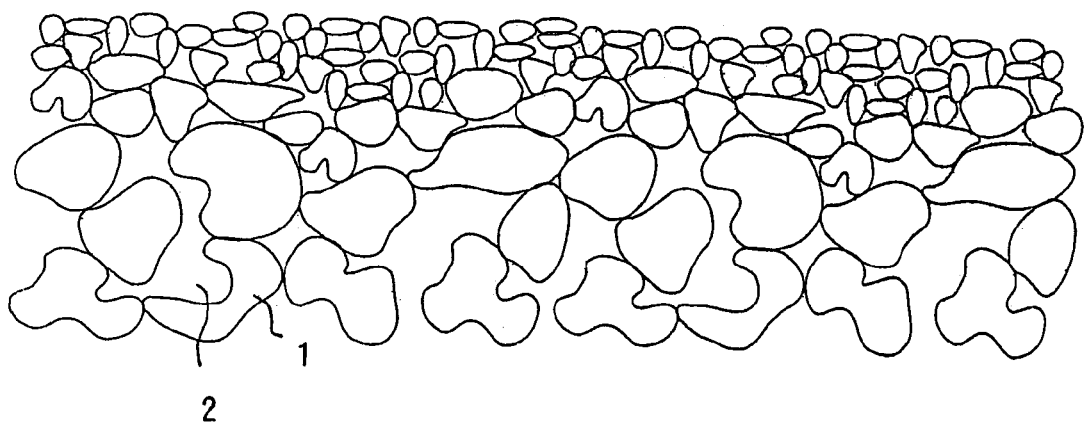
FIGS. 1(a) and 1(b) are image views showing a difference in structure between a prior art example metal sintered filter and an example metal sintered filter of the present invention, respectively.
Figure 1:
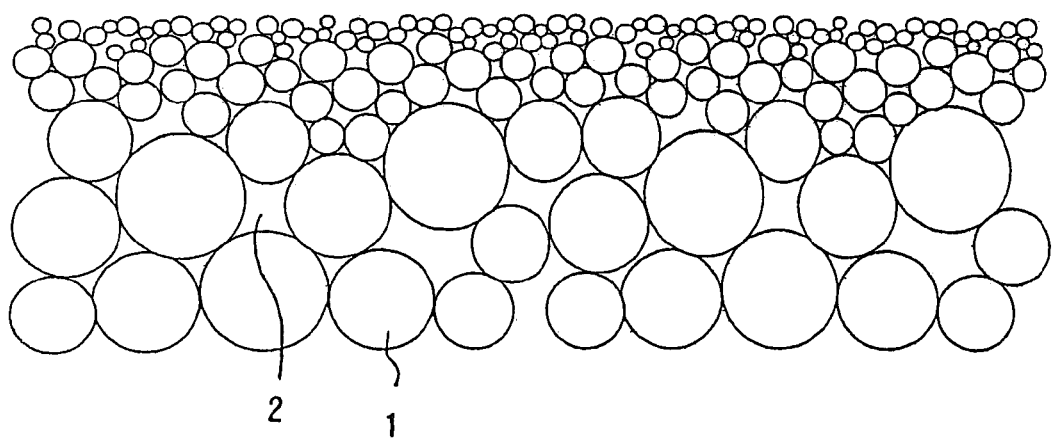

Description will be given of embodiments of the present invention below with reference to the accompanying drawings.

Raw material powder of titanium or a titanium alloy used in embodiments of the present invention is spherical particles of 150 µm or less (hereinafter referred to as spherical titanium powder for short) produced by means of a gas atomization method from titanium sponge. Since the spherical particles obtained by means of the gas atomization method is powder solidified during flying of melt spray of titanium, surfaces of particles of particles included in the powder is extremely smooth as compared with particles in irregular shapes in powder obtained by pulverizing titanium sponge or in powder obtained by hydrogenation/dehydrogenation.

In a case where a filter is fabricated using the spherical titanium powder described above, diameters of particles of the powder are desirably made uniform using a screen in order to achieve a desired performance. Then, a sintering vessel is filled with the spherical titanium powder uniform in particle diameter without applying a pressure to the powder therein. A void ratio of a sintering raw material filling the vessel without applying a pressure is adjustable in the range of from 35 to 55% by adjusting a particle size distribution of the sintering raw material. By applying vibration to the spherical titanium powder prior to the sintering, a void ratio is reduced so as to fall in the range of from 35 to 55%. There arises no chance of being 35% or less, however. Note that in a case where a pressure is applied in filling, a void ratio is reduced generally 35% or less.

While by sintering the spherical powder filling the sintering vessel without applying a pressure as described above, only contact points between spherical particles are fused to each other to bond, a mechanical strength required by a filter is sufficiently ensured. Since by sintering the spherical powder at a temperature range much lower than the melting point of titanium, the spherical powder is sintered while sustaining shapes of spherical particles prior to the sintering, a void ratio of the sintered compact does not change and the void ratio after the sintering remains in the range of from 35 to 55% unchanged from that prior to the sintering. Note that as far as the sintering is performed at the low temperature range, a sintered compact can be obtained in the range of 35 to 55% in void ratio.

Since spherical titanium powder can be industrially produced so as to be as small as in the range of from 10 to 150 µm in average particle diameter by means of a gas atomization method, a spherical titanium filter can be fabricated with a maximum pore diameter in the range of from 3 to 70 µm with the spherical titanium powder. That is, a titanium filter with fine pores and a small pressure drop can be fabricated with a high productivity. Note that if the spherical titanium powder falls outside and exceeds the range of from 10 to 150 µm in average particle diameter, it is impossible to obtain a sintered compact with a maximum pore diameter in the range of 3 to 70 µm.

On the other hand, while spherical powder can be produced according to a rotating electrode method, an obtained average particle diameter of spherical powder is generally 400 µm or more and it is difficult to industrially produce spherical powder with an average particle diameter of 150 µm or less and therefore, much harder to industrially produce spherical powder with an average particle diameter of 30 µm or less with a good yield.

A maximum pore diameter described above is measured with a mercury porosimeter method. The mercury porosimeter method gets started with immersing a specimen into mercury and then gradually raises a pressure of mercury. During the increase in pressure, as a pressure is raised, mercury intrudes into a pore with a smaller diameter; thereby obtaining a value discriminating between pore sizes of a porous compact. That is, a porous compact with a smaller maximum pore diameter has smaller pores and makes it possible to realize a filter so excellent in performance as to remove foreign matter with a smaller size.

In implementing the present invention, it is desirable to sinter raw material spherical titanium powder filling a cylindrical vessel at a temperature in the range of from 650 to 1200° C. much lower than the melting point of titanium without applying a pressure in order to equally maintain a void ratio of the raw material spherical titanium powder in the sintered compact without reduction in the void ratio of the raw material spherical titanium powder in the course of the sintering. If a sintering temperature is lower than 650° C., sintering is performed insufficiently, while if exceeding 1200° C., sintered portions are not limited to contact points between particles, but the bodies of particles are molten together, with the result that original shapes of spherical particles cannot be maintained to deform and contract, decreasing a void ratio and in turn, increasing a pressure drop.

Implementation of the present invention features no adoption of molding with a press which causes deformation of particles in powder; therefore, a sintered titanium filter can also be fabricated in a procedure in which a green preform is obtained by mixing spherical titanium powder with a proper binder as in a doctor plate method or an extrusion method and then, thus obtained green preform is degreased to remove the binder and vacuum sintered.

EXAMPLE 1

Billets were obtained from raw material titanium sponge and a melt thereof produced by electromagnetic induction heating was gas atomized in an Ar gas atmosphere. Obtained titanium powder was classified by vibration screening to obtain spherical powder with an average particle diameter of 10 µm. A high density alumina vessel in the shape of a square having one inner side of 100 mm and a depth of 3 mm was filled with the powder without applying a pressure thereto and then the powder was sintered keeping it at a vacuum degree of $7 \times 10^{-3}$ Pa at 1000° C. for 15 minutes without applying pressure to the powder.

EXAMPLE 2

A titanium sintered filter was fabricated in the same method and conditions as in Example 1 with the exception that the gas atomized powder was classified by vibration screening to obtain spherical powder with an average particle diameter of 29 µm.

EXAMPLE 3

Figure 2:
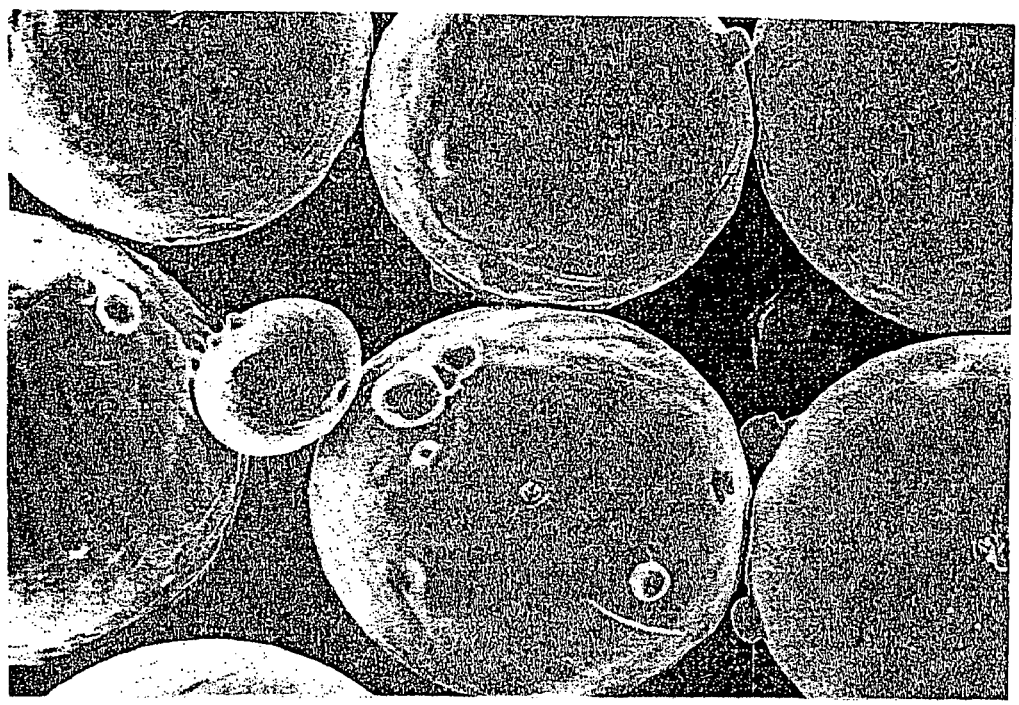
FIG. 2 is an electron microscopic photograph of a titanium sintered filter obtained by sintering without applying a pressure using spherical powder particles produced by means of a gas atomization method from titanium sponge as a raw material in an embodiment of the present invention.

A titanium sintered filter was fabricated in the same method and conditions as in Example 1 with the exception that the gas atomized powder was classified by vibration screening to obtain spherical powder with an average particle diameter of 124 µm. In FIG. 2, there is shown an electron microscopic photograph of the titanium sintered filter. It is found that each of particles of the titanium sintered filter is maintained in the shape of an unchanged sphere with many of voids.

EXAMPLE 4

A titanium sintered filter was fabricated in the same method and conditions as in Example 1 with the exception that the gas atomized powder was classified by vibration screening to obtain spherical powder with an average particle diameter of 140 µm. Furthermore, the same vessel as in Example 1 was filled with the powder without applying pressure, but followed by vibrations of 100 cycles imposed on the vessel with a vibration machine. On this occasion, also different from Example 1, the vessel was filled with the powder higher than 3 mm in height prior to the vibrations so that 3 mm in height resulted after the vibrations.

EXAMPLE 5

A titanium sintered filter was fabricated in the same method and conditions as in Example 1 with the exception that the gas atomized powder was classified by vibration screening to obtain spherical powder with an average particle diameter of 148 μm. Furthermore, the same vessel as in Example 1 was filled with the powder without applying pressure, but followed by vibrations of 100 cycles imposed on the vessel with a vibration machine. On this occasion, also different from Example 1, the vessel was filled with the powder higher than 3 mm in height prior to the vibrations so that 3 mm in height resulted after the vibrations.

In Examples 3,4 and 5, an average particle diameter of the raw material powder was adjusted so that a maximum pore diameter of a sintered filter obtained in each of the examples was in the range of from 47 to 68 μm, wherein if a pressure is applied, the pressure can be adjusted for the adjustment. The reason why a maximum pore diameter was adjusted in the range of from 47 to 68 μm is that a maximum pore diameter of a sintered filter used in a gas chromatography apparatus satisfies a condition requiring the maximum pore diameter of 70 μm or less. Since a sintered filter with the same maximum pore diameter is desirably more excellent in corrosion resistance and smaller in pressure drop, filters in the same shape were fabricated in Comparative examples 1, 2, and 4 to 6, described below, and pressure drops were compared with each other in a condition of a flow rate of 1 litter/min/cm².

COMPARATIVE EXAMPLE 1

Billets were obtained from raw material titanium sponge and a melt thereof produced by electromagnetic induction heating was gas atomized in an Ar gas atmosphere. Obtained titanium powder was classified by vibration screening to obtain spherical powder with an average particle diameter of 212 μm. A high density graphite vessel in the shape of a square having one inner side of 100 mm was filled with the powder and then the powder was sintered keeping it at a vacuum degree of 7×10⁻³ Pa at 1660° C. for 15 minutes under a pressure of 800 kg/cm² thereto to obtain a titanium sintered filter with a thickness of 3 mm.

COMPARATIVE EXAMPLE 2

A titanium sintered filter was fabricated in the same method and conditions as in Comparative example 1 with the exception that the gas atomized powder was classified by vibration screening to obtain spherical powder with an average particle diameter of 246 μm. Furthermore, a high density graphite vessel in the shape of a square having one inner side of 100 mm was filled with the powder and then the powder was sintered keeping it at a vacuum degree of 7×10⁻³ Pa at 1660° C. for 15 minutes under a pressure of 1200 kg/cm², which pressure was different from the temperature adopted in Comparative example 1, thereto to obtain a titanium sintered filter with a thickness of 3 mm.

COMPARATIVE EXAMPLE 3

A cylindrical titanium ingot is pulverized by means of a plasma rotating electrode method and the powder was classified by vibration screening to obtain spherical powder with an average diameter of 450 μm. A high density alumina vessel in the shape of a square having one inner side of 100 mm and a depth of 3 mm was filled with the classified powder without applying a pressure and then the classified powder was sintered keeping it at a vacuum degree of 7×10⁻³ Pa at 1000° C. for 15 minutes without applying a pressure thereto to obtain a titanium sintered filter.

COMPARATIVE EXAMPLE 4

Stainless steel powder sold on the market produced by means of a water atomization method was classified by vibration screening to obtain powder including particles in irregular shapes with an average particle diameter of 147 μm. The classified powder was sintered in the same condition as in Comparative example 3 to obtain a titanium sintered filter.

COMPARATIVE EXAMPLE 5

Figure 3:
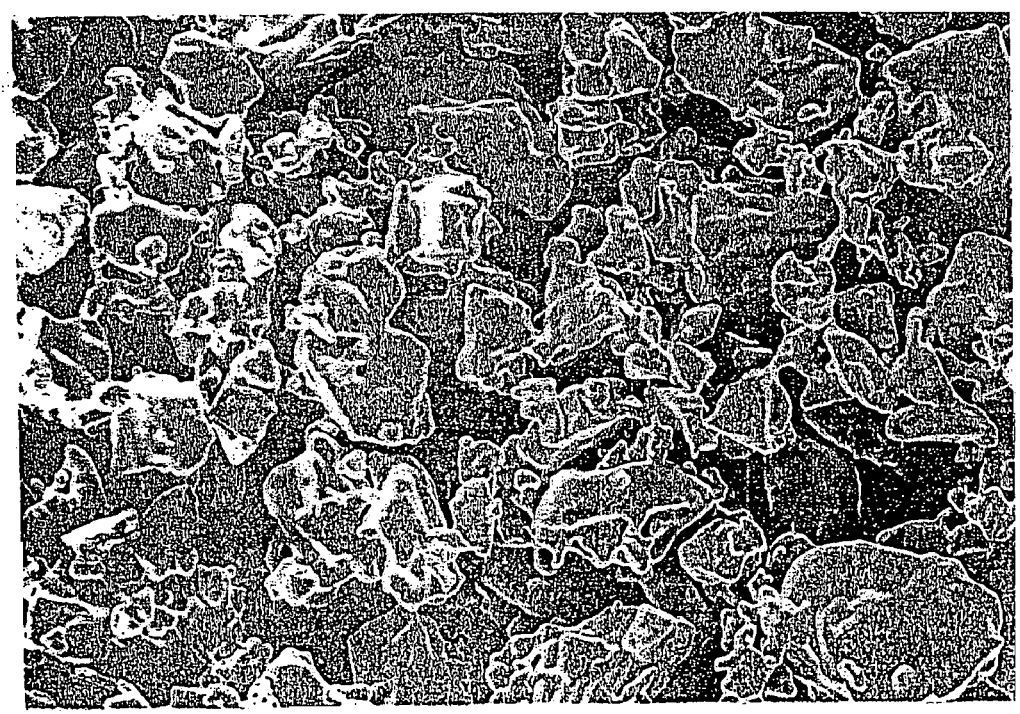
FIG. 3 is an electron microscopic photograph of a titanium sintered filter obtained by sintering without applying a pressure using particles in irregular shapes obtained by pulverizing titanium sponge as a raw material with a hydrogenation/dehydrogenation method

Powder obtained by pulverizing titanium sponge with a hydrogenation/dehydrogenation method was classified by vibration screening to obtain powder including particles in irregular shapes with an average particle diameter of 102 μm. The classified powder was sintered in the same condition as in Comparative example 3 to obtain a titanium sintered filter. In FIG. 3, there is shown an electron microscopic photograph of the titanium sintered filter. The sintered compact is composed of particles of irregular shapes.

COMPARATIVE EXAMPLE 6

Powder obtained by pulverizing titanium sponge with a mechanical crushing method was classified by vibration screening to obtain powder including particles in irregular shapes with an average particle diameter of 103 μm. The classified powder was sintered in the same condition as in Comparative example 3 to obtain a titanium sintered filter.

Physical parameters of raw material powder used in Examples 1 to 5 and Comparative examples 1 to 6 were compared and shown in table 1. Furthermore, in Table 2, there are shown physical parameters (void ratios, maximum pore diameters, particle diameters and pressure drops) of thus obtained sintered filters. Note that there are shown measured particle diameters of sintered filters only in Examples 1 to 4 of the present invention and Comparative example 3, where shapes of spherical particles in raw material powder are maintained after the sintering. Furthermore, pressure drops of a fluid are shown at a flow rate of 1 litter/min/cm² by comparison.

TABLE 1

| | Raw material powder | | | |
|---|---|---|---|---|
| | Raw Material of Powder | Production Method | Shape | Average Diameter (μm) |
| Example 1 | Titanium sponge | gas atomization method | Spherical | 10 |
| Example 2 | Titanium sponge | gas atomization method | " | 29 |
| Example 3 | Titanium sponge | gas atomization method | " | 124 |
| Example 4 | Titanium sponge | gas atomization method | " | 140 |
| Example 5 | Titanium sponge | gas atomization method | " | 148 |
| Comparative Example 1 | Titanium sponge | gas atomization method | " | 212 |
| Comparative Example 2 | Titanium sponge | gas atomization method | " | 246 |
| Comparative Example 3 | Titanium ingot | plasma rotating electrode method | " | 450 |
| Comparative Example 4 | Stainless steel ingot | Water atomization method | Irregular | 147 |

TABLE 1-continued

| | Raw material powder | | | |
|---|---|---|---|---|
| | Raw Material of Powder | Production Method | Shape | Average Diameter (μm) |
| Comparative Example 5 | Titanium sponge | Hydrogenation/ dehydrogenation method | " | 102 |
| Comparative example 6 | Titanium sponge | Mechanical crushing method | " | 103 |

TABLE 2

| | | sintered filter | | | |
|---|---|---|---|---|---|
| | Sintering method | void ratio (%) | maximum pore diameter (μm) | Particle diameter (μm) | Pressure drop (kgf/cm$^2$) |
| Example 1 | Without pressure | 41 | 3 | 10 | ... |
| Example 2 | Without pressure | 42 | 12 | 32 | ... |
| Example 3 | Without pressure | 44 | 47 | 156 | 0.12 |
| Example 4 | Without pressure | 37 | 48 | 190 | 0.16 |
| Example 5 | Without pressure | 44 | 68 | 146 | 0.11 |
| Comparative Example 1 | Under pressure | 34 | 49 | ... | 0.42 |
| Comparative Example 2 | Under pressure | 30 | 48 | ... | 1.2 |
| Comparative Example 3 | Without pressure | 47 | 140 | 460 | ... |
| Comparative Example 4 | Without pressure | 51 | 48 | ... | 0.55 |
| Comparative Example 5 | Without pressure | 56 | 47 | ... | 0.40 |
| Comparative example 6 | Without pressure | 61 | 49 | ... | 0.38 |

Note that an average particle diameter of spherical particles included in a titanium sintered filter is measured in the following way. A diagonal is drawn between opposed vertices in a field of view in the shape of a rectangle when observing with a microscope and measurement is performed on diameters of all of selected particles, 50% or more of the contour of each of which is viewed, among particles on the diagonal. Then, first 10 measured values are selected in descending order of a diameter to calculate an average thereof. The measurement is repeated 10 times at different sites and 10 calculated average values are further averaged to eventually obtain an average particle diameter of the spherical particles. It is found from Tables 1 and 2 that an average spherical particle diameter of a titanium sintered filter obtained according to this procedure is almost the same as that of corresponding raw material powder.

While in the above examples, titanium sponge was raw material, there can be used as raw material: titanium scrap and titanium ingot. Furthermore, in a case where a sintered filter of a titanium alloy is fabricated, a desired titanium alloy ingot is used for producing raw material powder.

In Examples 3 and 4 and Comparative examples 1, 2, 4, 5 and 6 described above shown in Tables 1 and 2, particle diameters of raw material and a sintering pressure are adjusted and sintered so that in each example, a maximum pore diameter of a sintered filter took 48±1 μm. It is found from the results of the comparison tests that there is a great difference in pressure drop between Examples 2 and 3 in which sintering was performed without applying a pressure using powder with an average particle diameter of 181 μm or less, and Comparative examples 1 and 2 in which sintering was performed under a pressure using powder with an average particle diameter of 200 μm or more, though the powder produced according to the same gas atomization method was used as raw material in both example groups, and it is further found that a sintered filter fabricated by execution of the present invention has a smaller pressure drop.

Figure 4:
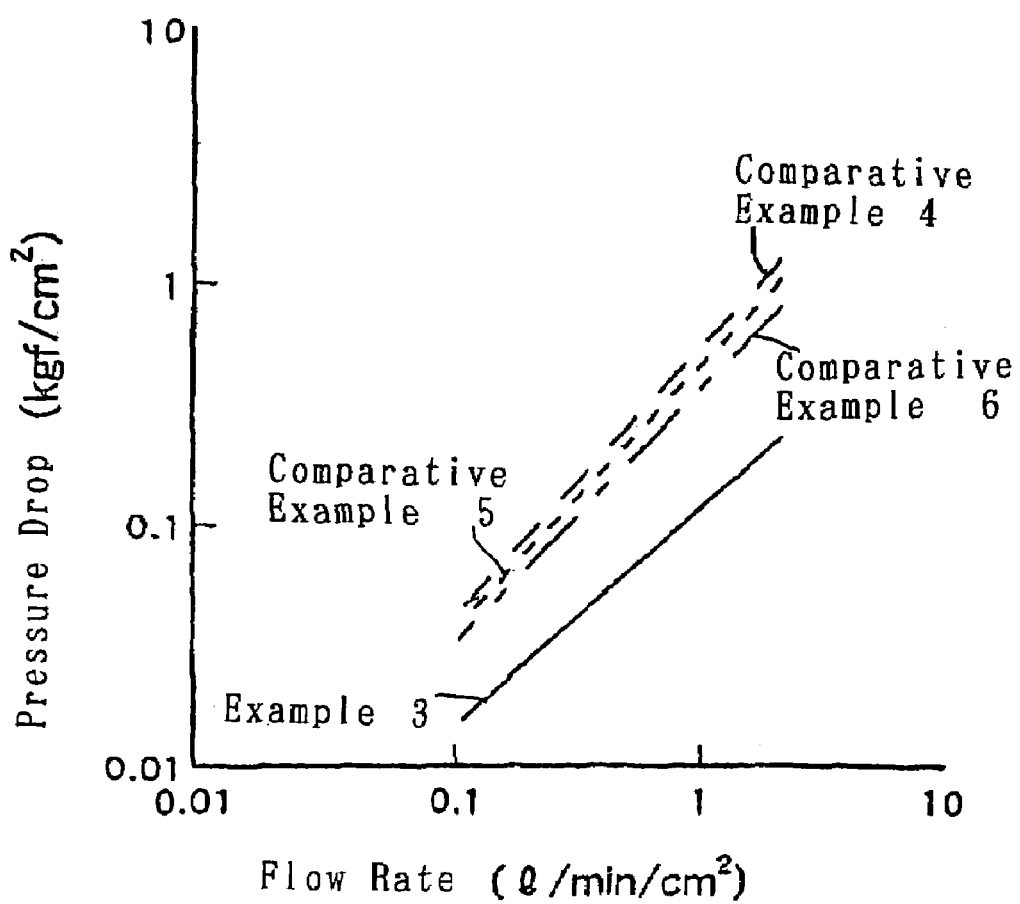
FIG. 4 is a graph showing, by comparison, relationships between a flow rate of a passing fluid and a pressure drop in Example 3 of the present invention and Comparative examples 4 to 6.

It is found that a pressure drop is large in any of sintered filters of Comparative examples 4 to 6 fabricated by sintering powder including particles in irregular shapes produced according to a water atomization method, a hydrogenation/ dehydrogenation method, a mechanical crushing method except for a gas atomization method without applying a pressure. What's worse, the stainless steel sintered filter of Comparative example 4 has a problem of poor corrosion resistance. Note that in FIG. 4, there are shown relationships between a flow rate of a passing fluid and a fluid pressure drop in Example 3 and Comparative examples 4, 5, and 6. While in any case, a pressure drop is larger with an increased flow rate, a pressure drop in Example 3 of the present invention is the smallest.

Figure 5:
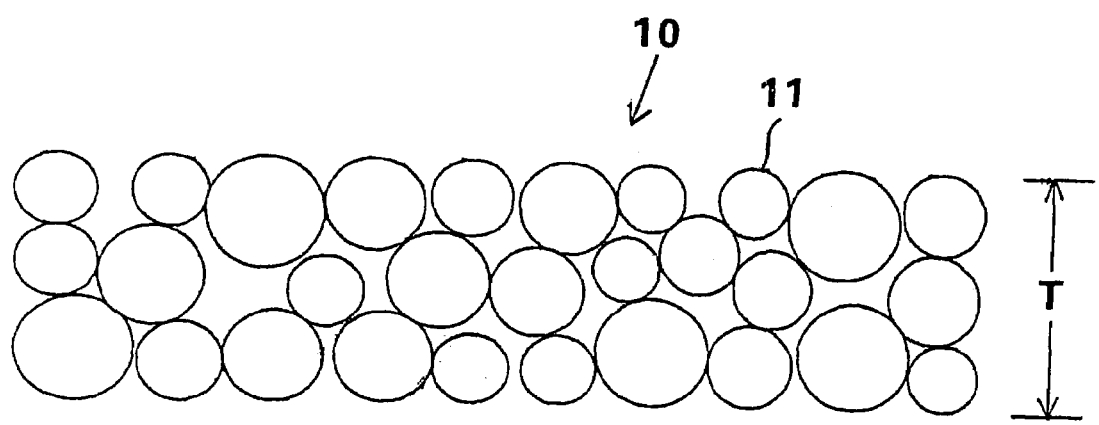
FIG. 5 is an image view of a titanium powder sintered compact showing a second embodiment of the present invention.

FIG. 5 is a model sectional view of a titanium powder sintered compact showing a second embodiment of the present invention.

A sintering vessel in the shape of a dish made of high density alumina is filled with spherical gas atomized titanium powder 11 having a prescribed average diameter and thereafter, the spherical gas atomized titanium powder 11 is vacuum sintered without applying a pressure, thereby fabricating a porous sintered compact 10 in the form of a thin plate.

A plate thickness T of the sintered compact 10 is 500 μm or less. Adjacent spherical particles are fused to each other in point contact and the sintered compact 10 of a plate thickness of 500 μm or less exerts an excellent bending characteristic. That is, portions where adjacent particles are fused to each other in point contact are uniformly distributed throughout all of a titanium powder sintered compact using spherical gas atomized powder to thereby cause no local concentration of a bending stress, leading to excellency in a bending characteristic of the sintered compact.

A sintering temperature is preferably selected in the range of from 650 to 1200° C. much lower than the melting point of titanium. If a sintering temperature is lower than 650° C., sintering is not sufficiently performed. If exceeding 1200° C., sintering portions are not limited to contact points between individual particles but the bodies of particles are molten together, so there arises a risk that a void ratio and cavity diameters at proper levels cannot be ensured. A sintering temperature is changed in the range of temperatures, thereby controlling a void ratio and cavity diameters. Furthermore, a bending characteristic is also controlled.

As examples of the present invention and comparative examples thereof, there were fabricated titanium powder sintered compacts each in the shape of a thin plate with kinds of plate thickness and commonly in the shape of a square having one side of 150 mm using spherical gas atomized titanium powder sold on the market described above, that is fine particles in the range of 45 μm or less (an average particle diameter of 25 μm) and coarse particles in the range of from 45 to 150 μm (an average particle diameter of 80 μm).

Furthermore, a titanium powder sintered compact in the shape of a thin plate with similar dimensions was fabricated, as a prior art example, by a press in molding using hydrogenation/dehydrogenation titanium powder (an average particle diameter of 25 μm) sold on the market.

Breakage states of thus fabricated titanium powder sintered compact in the shape of a thin plate wound around a cylinder with an outer diameter of 40 mm (a radius of curvature of 20 mm) were investigated to thereby compare between bending characteristics. Results are shown in Table 3.

TABLE 3

|  | Thickness T μm | average particle diameter D μm | Void ratio % | presence or absence of breakage |
|---|---|---|---|---|
| Example 1 | 100 | 80 | 67 | ◯ |
| Example 2 | 400 | 80 | 50 | ◯ |
| Example 3 | 500 | 80 | 47 | ◯ |
| Comparative Example 1 | 600 | 80 | 44 | X |
| Example 4 | 100 | 25 | 55 | ◯ |
| Example 5 | 400 | 25 | 48 | ◯ |
| Example 6 | 500 | 25 | 45 | ◯ |
| Comparative Example 2 | 600 | 25 | 42 | X |
| Prior Art Example 1 | 100 | 25 | 62 | X |
| Prior Art Example 2 | 400 | 25 | 56 | X |
| Prior Art Example 3 | 500 | 25 | 53 | X |
| Prior Art Example 4 | 600 | 25 | 51 | X |

As understood from Table 3, in a case where spherical gas atomized titanium powder was used as titanium powder and a plate thickness is 500 μm or less, an excellent characteristic can be attained independently of particle diameters in the plate (in a case of either fine particles or coarse particles).

Figure 6:
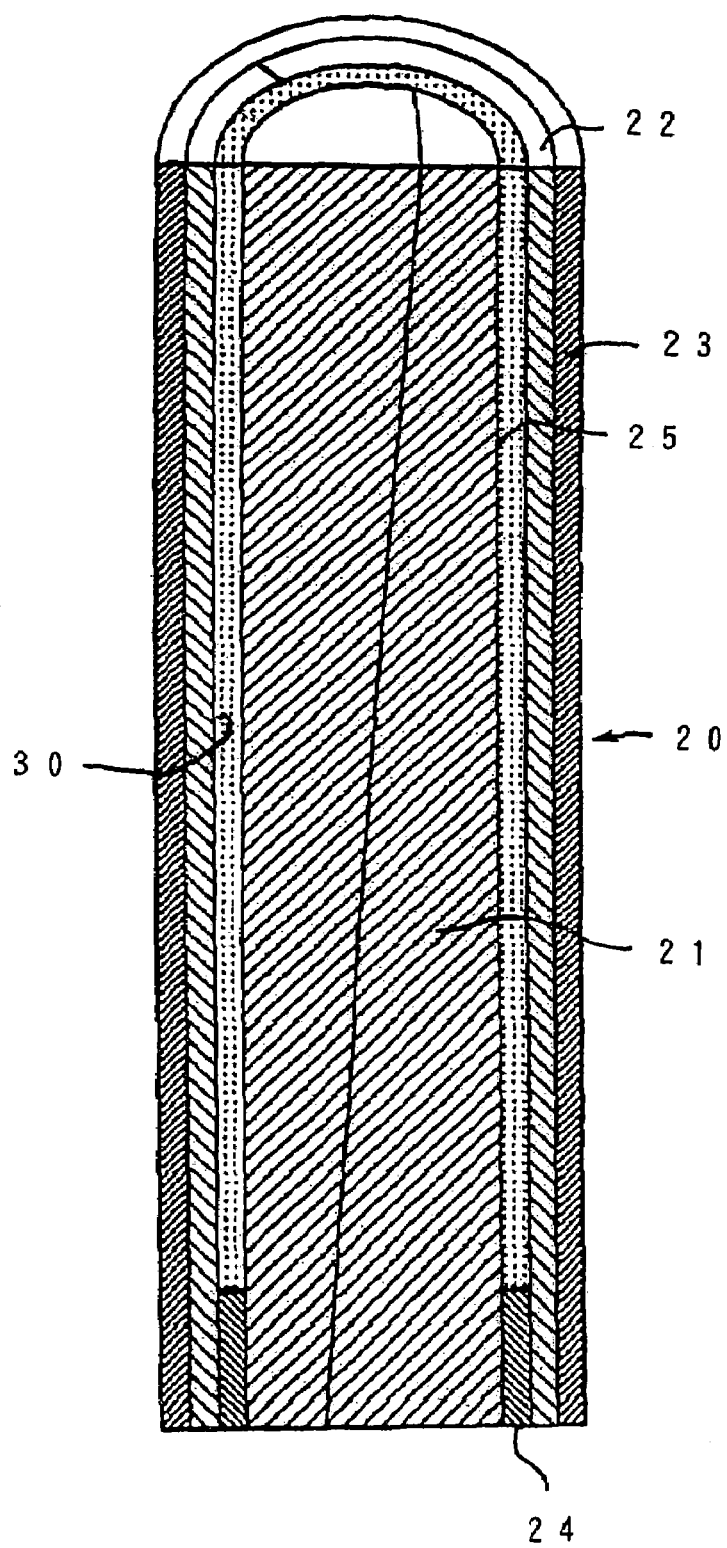
FIG. 6 is a descriptive view for a fabrication method for a cylindrical porous compact showing a third embodiment of the present invention and a sectional view showing a filling state of spherical gas atomized titanium powder.

FIG. 6 is a descriptive view for a fabrication method for a cylindrical porous compact showing a third embodiment of the present invention and a sectional view showing a filling state of spherical gas atomized titanium powder.

A sintering vessel 20 made of high density alumina is constructed of: an inner mold part 21 in the shape of a cylinder; an outer mold part 22 in the shape of a cylinder arranged at the outside of the inner mold part 21 with a prescribed clearance therebetween; a fixing mold part 23 arranged at the outside of the outer mold part 22 to fix the outer mold part 22; a spacer 24 in the shape of a ring arranged at the lowest position of the sintering vessel 20 between the inner mold part 21 and the outer mold part 22 in order to form an annular space 25 therebetween.

The inner mold part 21 is divided into two pieces obliquely to the height direction for removal and, together with the spacer 24 in the shape of a ring, inserted inside the outer mold part 22. The outer mold part 22 is also divided into two pieces in a circumferential direction for removal and firmly held by the fixing mold part 23 outside the outer mold part 22 into a coalesced state.

The sintering vessel 20 is assembled to form a clearance 25 of an annular shape in section on and above the spacer 24 between the inner mold part 21 and the outer mold part 22. The clearance 25 in an annular shape in section is filled with spherical gas atomized titanium powder 30 without applying a pressure. Then, the spherical gas atomized titanium powder 30 in the sintering vessel 20 was vacuum sintered without applying a pressure.

In such a way, a cylindrical titanium powder sintered filter is fabricated. In the filter, contact states between particles are good and sizes of cavities formed between particles, are made uniform; therefore, a sufficient strength and uniform cavity diameters can be ensured. As a result, a tall filter can be fabricated at a low cost. With decrease in particle diameters, cavity diameters can be reduced without changing a packing density. By making particle diameters uniform, uniformity in cavity diameters can be further improved. Furthermore, since each of shapes of cavities is enclosed by a smooth curved surface, there is a small chance for plugging pores and the filter is excellent in reverse-washing reproducibility.

A sintering temperature is preferably in the range of from 650 to 1200° C. much lower than the melting point of titanium. If a sintering temperature is lower than 650° C., sintering is not sufficiently performed. If exceeding 1200° C., sintering portions are not limited to contact points between individual particles but the bodies of particles are molten together, even without applying a pressure, so there arises a risk that a void ratio and cavity diameters at proper levels cannot be ensured.

By changing a sintering temperature, a void ratio and cavity diameters are controlled as described above. Hence, an optimal sintering temperature differs according to particle diameters in the powder to be sintered. For example, it is desirable that a sintering temperature is especially in the range of from 850 to 1200° C. for coarse particles in the range of from 45 to 150 μm in particle diameter. If a sintering temperature is lower than 850° C., there is a risk that sintering is not sufficiently performed. On the other hand, in a case where fine particles of 45 μm or less are used, it is desirable that a sintering temperature is especially in the range of 650 to 850° C. since sufficient sinterability is ensured even in a comparatively low temperature range.

As an example of the present invention, fabricated in the method described above was a cylindrical titanium sintered filter with a height of 250 mm, an outer diameter of 60 mm, an inner diameter of 56 mm and a wall thickness of 2 mm. Used spherical gas atomized titanium powder was in the range of from 45 to 150 μm in particle diameter, an atmosphere in the sintering furnace was in a vacuum state, a sintering temperature was 1100° C. and a sintering time was 30 minutes. Investigation was performed about a void ratio and cavity diameters of a fabricated filter at 5 points in the height direction.

As a comparative example, a titanium sintered filter in the shape of the same cylinder was fabricated using hydrogenation/dehydrogenation titanium powder sold on the market (in the range of from 45 to 150 μm in particle diameter) while additionally using press molding. Investigation was performed about a void ratio and cavity diameters of a fabricated filter at 5 points in the height direction.

Results of the investigations are shown in Tables 4 and 5. In the example, the void ratios and cavity diameters are made uniform in the height direction despite no use of a press, whereas in the comparative example, filling of titanium powder was not uniformly performed despite application of press molding; therefore, variations were large in void ratios and cavity diameters.

TABLE 4

| measuring points | Void ratio (%) | | | | | |
|---|---|---|---|---|---|---|
| | 1 | 2 | 3 | 4 | 5 | averages |
| Example | 41 | 42 | 42 | 42 | 43 | 42 |
| Comparative Example | 63 | 57 | 56 | 65 | 54 | 59 |

TABLE 5

| measuring points | Average Cavity Diameter (μm) | | | | | |
|---|---|---|---|---|---|---|
| | 1 | 2 | 3 | 4 | 5 | averages |
| Example | 26 | 27 | 26 | 25 | 23 | 25 |
| Comparative Example | 41 | 36 | 41 | 44 | 33 | 39 |

Comparison was performed between both cases in reverse-washing reproducibility. That is, a solution obtained by mixing silica beads having an average diameter of 10 μm into water at a concentration of 10 mg/litter was filtered through filters so that an increase in weight of a filter after drying is constant, thereafter, reverse-washing was performed on the filters for a prescribed time at an air pressure of 5 kgf/cm² and after drying, the filters were weighed to obtain a change between weights before and after the procedure described above, thereby having evaluated reverse-washing reproducibility. In the example, 94% of the increase in weight was removed by reverse-washing, while in the comparative example, only 78% were removed.

Note that while in the embodiments described above, cylindrical products were fabricated directly form the powder, it is possible that two parts of the product in the shape of a semi-cylinder are separately fabricated and thereafter, the two parts are welded to complete a cylinder. Besides, a shape of a sintered product is not limited to a cylinder, but may be a long, hollow body with a straight side and a section in the shape of a polygon or the like.

Figure 7:
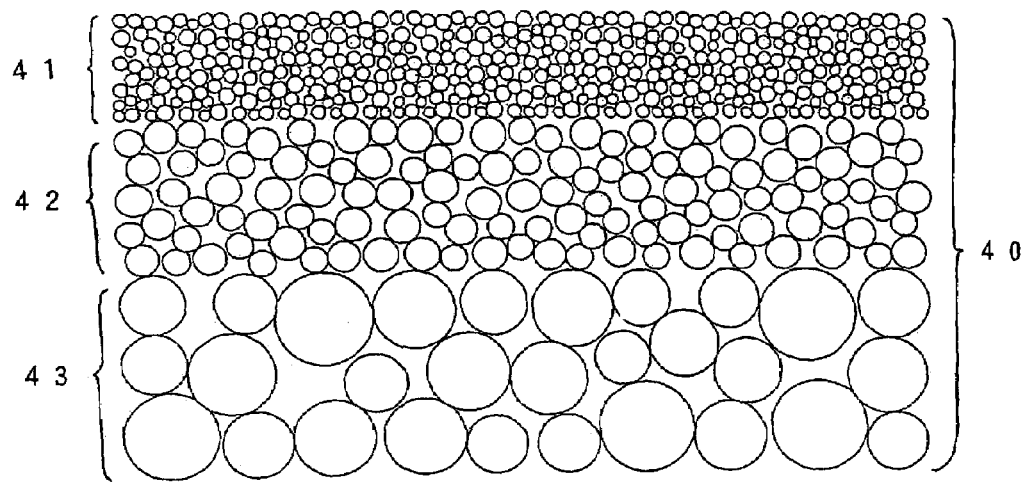
FIG. 7 is a model sectional view of a metal sintered filter showing a fourth embodiment of the present invention.

FIG. 7 is a model sectional view of a metal sintered filter showing a fourth embodiment of the present invention.

A sintering vessel made of high density alumina is filled with spherical gas atomized titanium powder with a prescribed average particle diameter without applying a pressure and thereafter, the spherical gas atomized titanium powder is vacuum sintered without applying a pressure, thereby fabricating a first plate-like porous compact 41.

A second plate-like porous compact 42 is fabricated in a similar way with the exception that spherical gas atomized titanium powder with an average particle diameter larger than the spherical gas atomized titanium powder used in the first plate-like porous compact 41. In this process; a sintering temperature is adjusted so that the same void ratio as in the first plate-like porous compact 41 is realized.

A third plate-like porous compact 43 is fabricated in a similar way with the exception that spherical gas atomized titanium powder with an average diameter larger than the spherical gas atomized titanium powder used in the second plate-like porous compact 42. In this process, a sintering temperature is adjusted so that the same void ratio as in the first plate-like porous compact 41 and the second plate-like porous compact 42 is realized.

The fabricated three plate-like porous compacts 41, 42 and 43 are superposed one on another and sintered to thereby fabricate a sintered filter 40 of a three-layer structure. Since the fabricated sintered filter 40 is constructed with three kinds of powder each different in diameters of particles used therein from the other, cavity diameters in a porous compact are increased in order of the plate-like porous compacts 41, 42 and 43. A void ratio is almost constant in plate-like porous compacts because of filling without applying a pressure. A variation among cavity diameters in each porous compact is small and shapes thereof each are enclosed with a smooth curved surface and uniform.

A performance of the sintered filter 40 as a filter is excellent by adopting a design in which a treated liquid is caused to pass through the plate-like porous compacts 41, 42 and 43 in the order to thereby trap almost all of solid matter in the treated liquid with the plate-like porous compact 41 having cavity diameters smallest in a diameter range, thereby obtaining excellent reverse-washing reproducibility. That is, since in this design, the solid matter is not filtered out on the plate-like porous compacts 42 and 43 in a distributed state and in addition, shapes of cavities in the plate-like porous compact 41 are smooth and uniform, the solid matter trapped in the cavities is removed smoothly in reverse-washing.

Sintering temperatures in respective sintering are preferably selected in the range of from 650 to 1200° C. much lower than the melting point of titanium. If a sintering temperature is lower than 650° C., sintering is not sufficiently performed. If exceeding 1200° C., sintering portions are not limited to contact points between individual particles but the bodies of particles are molten together even without applying a pressure, so there arises a risk that void ratios and cavity diameters at proper levels cannot be ensured. By changing sintering temperature in this range, void ratios and cavity diameters are controlled as described above.

As an example of the present invention, a titanium sintered filter of a three-layer structure was fabricated according to the method described above. A thickness of each layer was 1 mm; (3 mm in total). Average diameters of particles included in spherical gas atomized titanium powder used in layers were 20 μm, 60 μm and 100 μm, respectively, and maximum cavity diameters of the layers were 6 μm, 22 μm and 37 μm, respectively. The void ratios of the layers were all 45%.

As a comparative example, a titanium sintered filter of a similar structure was fabricated using hydrogenation/dehydrogenation titanium powder sold on the market. In fabrication of three plate-like porous compacts, a press was necessary for molding and making cavity diameters uniform. Variations were observed in void ratios of respective layers and 55%, 48% and 37%.

Comparison was performed between both cases in reverse-washing reproducibility. That is, a solution obtained by mixing silica beads having an average diameter of 10 μm into water at a concentration of 10 mg/litter was filtered through the filters so that an increase in weight of a filter after drying is constant, thereafter, reverse-washing was performed on the filters for a prescribed time at an air pressure of 5 kgf/cm² and after drying, the filters were weighed to obtain a change between weights before and after the procedure described above, thereby having evaluated reverse-washing reproducibility. In the example, 97% of the increase in weight was removed by reverse-washing, while in the comparative example, only 83% was removed.

In the embodiment described above, the plate-like porous compacts each different in cavity diameters therein from another were individually fabricated in advance, while a similar layered structure can also be obtained in a procedure in which titanium particle layers each different in diameters of particles therein from another are sequentially stacked and sintered. Incidentally, a layered structure shown in FIG. 1(b) is fabricated by mans of the latter method.

Figure 8:
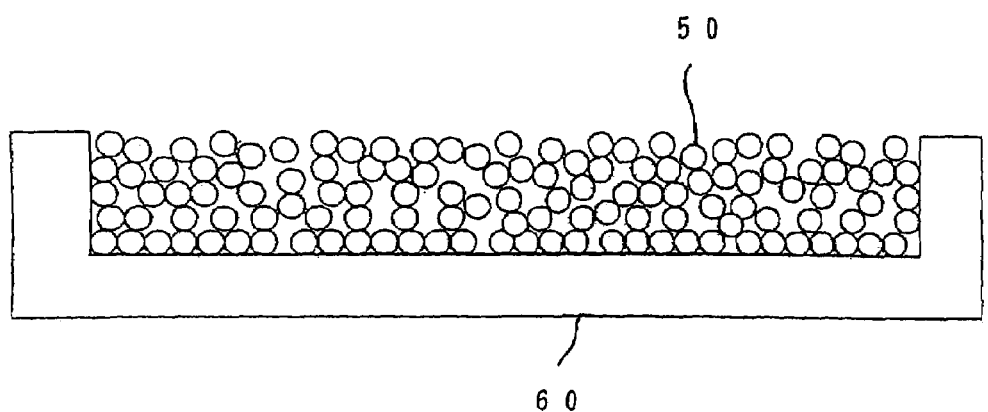
FIG. 8 is a descriptive view for a fabrication method for a porous conductive plate showing a fifth embodiment of the present invention and a sectional view showing an example filling state of spherical gas atomized powder.
Figure 9:
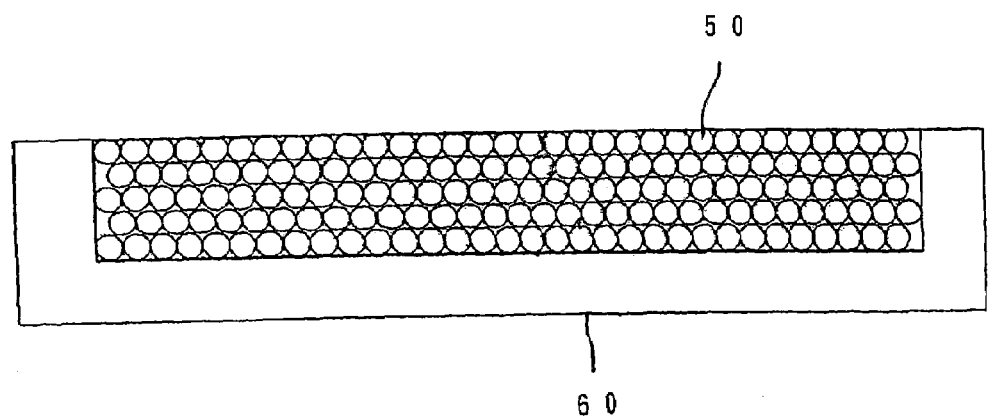
FIG. 9 is a sectional view showing another example filling state of spherical gas atomized powder.
Figure 10:
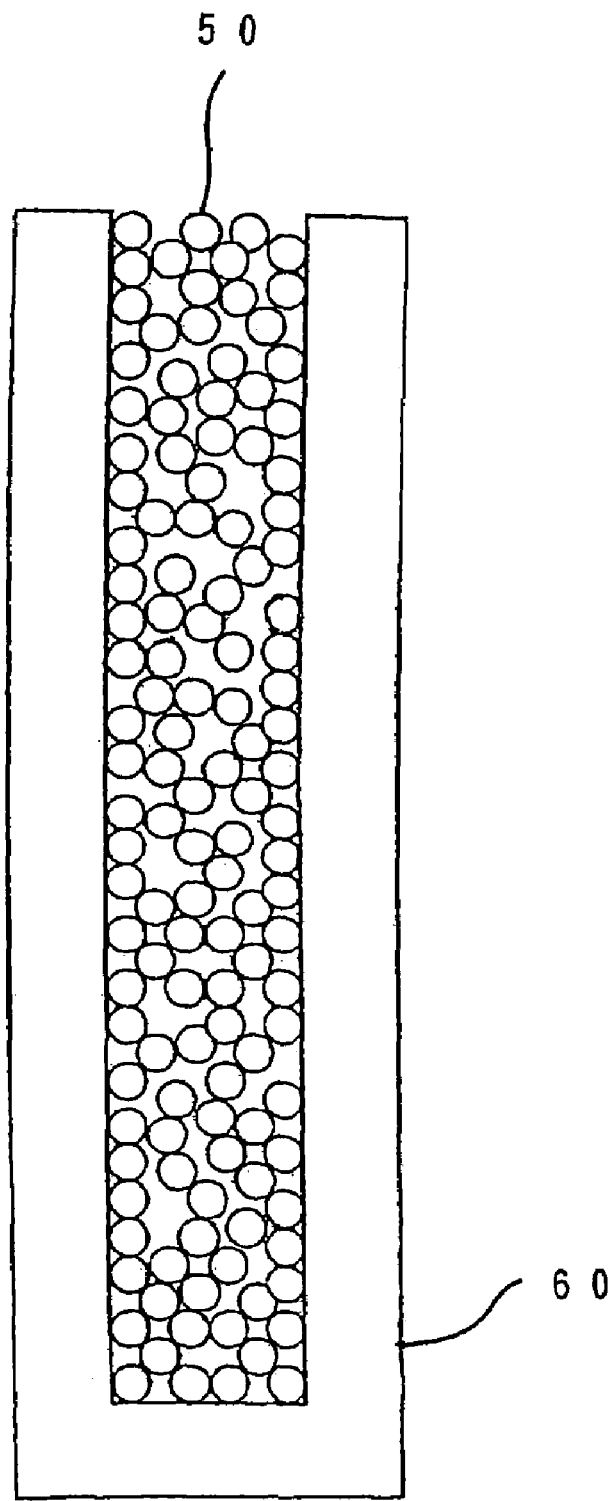
FIG. 10 is a sectional view showing still another example filling state of spherical gas atomized powder.

FIGS. 8 to 10 are descriptive views of fabrication methods for porous conductive plates showing a fifth embodiment of the present invention and sectional views showing filling states of particles included in spherical gas atomized powder.

As shown in FIG. 8, first of all, a sintering vessel 60 made of high density alumina is filled with spherical gas atomized titanium powder 50 having prescribed particle diameters without applying a pressure. A shape of an inner space of the sintering vessel 60 is of the shape of a thin plate corresponding to a shape of a porous conductive plate to be fabricated. Then, the spherical gas atomized titanium powder 50 filling the sintering vessel 60 is vacuum sintered without applying a pressure.

A sintering temperature is preferably selected in the range of from 650 to 1200° C. much lower than the melting point of titanium. If a sintering temperature is lower than 650° C., sintering is not sufficiently performed. If exceeding 1200° C., sintering portions are not limited to contact points between individual particles but the bodies of particles are molten together even without applying a pressure, so there arises a risk that a void ratio at a proper level cannot be ensured.

By means of such a method, there were fabricated three kinds of porous conductive plates, commonly in the shape of a square having one side of 50 mm each, and respective thickness of 1 mm, 0.5 mm and 0.2 mm as an example of the present invention.

Spherical gas atomized titanium powder was powder sold on the market as described above and powder of coarse particles (in the range of from 45 to 150 µm) was used for fabricating the porous conductive plates of 1 mm and 0.5 mm in thickness, respectively, while powder of fine particles (of 45 µm or less) was used for fabricating the porous conductive plate of 0.2 mm in thickness. A degree of a vacuum was $7 \times 10^{-3}$ Pa and a sintering temperature was about 1000° C. for the coarse particles while being about 800° C. for the fine particles. Furthermore, a temperature holding time was a constant value of about 15 minutes for both of the coarse particles and the fine particles. The void ratios of the fabricated porous conductive plates were all about 45%.

Electrical resistance of thus fabricated porous conductive plates were measured with a four-probe method with the results that the porous conductive plate of 1 mm in thickness had 10 mΩ, the porous conductive plate of 0.5 mm in thickness had 15 mΩ and the porous conductive plate of 0.2 mm in thickness had 12 mΩ because of the use of the powder of fine particles in this last case. As to physical conditions of one surfaces of the plates, the one surfaces were planarized since particles included in spherical gas atomized titanium powder were arranged in conformity with the upper surface profile of the bottom of the sintering vessel. Since spherical gas atomized titanium powder is good in fluidity, a void ratio is comparatively uniform throughout all of a porous conductive plate.

For the purpose of comparison, hydrogenation/dehydrogenation titanium powder sold on the market (in the range of from 50 to 150 µm in particle diameter with an average particle diameter of 100 µm) was sintered to fabricate porous conductive plates that were each in the shape of a square of 50 mm in one side, had thickness values of 1 mm and 0.5 mm, respectively, and commonly had a void ratio of 45%. Molding with a press was necessary to attain a void ratio of 45%. Electrical resistance values were equal to those in the example, while strength values were insufficient. This is inferred because powder of particles in irregular shapes are used, therefore titanium particles are not uniformly bonded therebetween. This non-uniformity in bonding between particles is resulted in variations in void ratios in all of a porous conductive plate.

On the other hand, a titanium fiber sintered plate sold on the market (with a thickness of 0.8 mm) has a void ratio as large as 60% and electrical resistance was as high as 30 mΩ. Though a strength was sufficient, on a surface thereof were so much of fine protrusions that the sintered plate cannot be brought into press contact with a film electrode laminates. Spherical gas atomized titanium powder sold on the market described above was plasma sprayed on one surface of the titanium fiber sintered compact to a thickness of 0.2 mm, totaling 1 mm as a whole. Though a void ratio of all of the sintered compact assumed 45% and the one surface was planarized, an electrical resistance was still as large as 20 mΩ, which was twice as high as in the example.

In the example described above, while a sintering temperature in the case where the coarse particles were used was about 1000° C., a void ratio of a porous conductive plate at a sintering temperature of 1100° C. was reduced to about 40%. A void ratio of a porous conductive plate in the example at a sintering temperature of 900° C. increased to about 50%. Any of the porous conductive plates was high in strength, excellent in surface smoothness and low in resistance.

As a method for raising a surface smoothness to a higher level, there is exemplified a method in which a sintering vessel with a necessary size is filled with spherical gas atomized titanium powder while giving vibrations to the powder. With a vibration filling adopted, as shown in FIG. 9, a surface smoothness can be improved not only on a surface in contact with the upper surface of the bottom of the sintering vessel 60, but also on the surface of the opening side and in addition, a void ratio is made more uniform. As shown in FIG. 10, it is effective to use a sintering vessel 60 constructed so that a plate shaped space formed inside the vessel is vertically long. With an inner plate like space extended vertically adopted, spherical gas atomized titanium powder 50 filling the space receives loads in the plate thickness direction caused by a weight of itself to improve surface smoothness on both surfaces. In any of the methods, increase in packing density accompanies reduction in void ratio and both can be used in parallel.

As molding methods, there may be exemplified in addition to combined natural filling and vacuum sintering: a doctor blade method, an injection molding method, an extrusion method and the like, with any of which it is allowed that a green preform is prepared using a mixture of spherical gas atomized titanium powder with a binder, followed by sequentially removing a binder from the green preform and sintering. Furthermore, it is possible to roll a porous sintered conductive plate after sintering, or alternatively, to roll a green preform, thereby enabling more of surface smoothness and adjustment of a void ratio in the plate. Still furthermore, it is also effective for surface smoothness to narrow a range of a particle diameter distribution of spherical gas atomized titanium powder.

Figure 11:
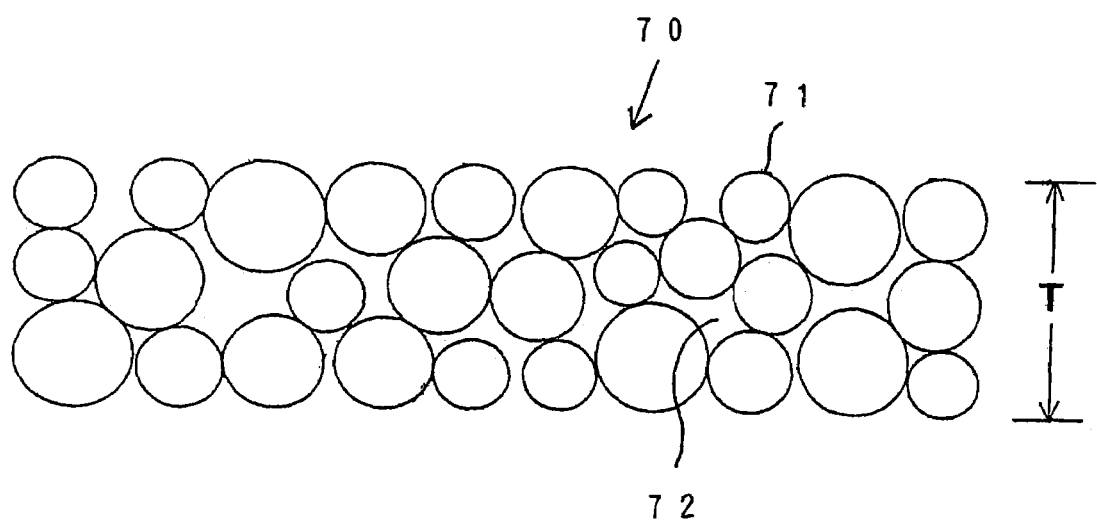
FIG. 11 is an image view of a highly corrosion resistant porous plate showing a sixth embodiment of the present invention.

FIG. 11 is a model sectional view of a highly corrosion resistant porous plate showing a sixth embodiment of the present invention.

A sintering vessel in the shape of a dish made of high density alumina is filled with spherical gas atomized titanium powder 71 having a prescribed average particle diameter and thereafter, the spherical gas atomized titanium powder 71 is vacuum sintered without applying a pressure, thereby fabricating a thin, large area porous plate 70 with a high corrosion resistance.

Here, a plate thickness T of the porous plate 70 is 1/10000 times or less of a numerical value of the area S. That is, $T/S \leq 1/10000$. Since adjacent spherical particles are in point contact and fused to each other and sizes of cavity 72 formed between particles are uniform, uniformity in void ratio in a porous plate is high and the uniformity increases as particle diameters are made more uniform, satisfying a requirement for a standard deviation being 3% or less.

A sintering temperature is preferably selected in the range of from 650 to 1200° C. much lower than the melting point of titanium. If a sintering temperature is lower than 650° C., sintering is not sufficiently performed. If exceeding 1200° C., sintering portions are not limited to contact points between individual particles but the bodies of particles are molten together even without applying a pressure, so there arises a risk that void ratios and cavity diameters at proper levels cannot be ensured. A void ratio is controlled by changing a sintering temperature within the temperature range.

As an example of the present invention, a porous plate in the shape of a square with one side of 200 mm and having a thickness of 2 mm was fabricated using the above described spherical gas atomized titanium powder sold on the market, that is fine particles in the range of 45 µm or less in particle diameter (with an average particle diameter of 25 µm) and coarse particles in the range of from 45 to 150 µm in particle diameter (with an average particle diameter of 80 µm). It is T/S=1/20000. A high density alumina vessel was used as a sintering vessel and the vessel was filled with the spherical gas atomized titanium powder without applying a pressure, followed by vacuum sintering without applying a pressure. Conditions for sintering were at 800° C. for 1 hour or the case where the fine particles and at 1000° C. for 1 hour for the case where the coarse particles.

As Comparative example 1, hydrogenation/dehydrogenation powder sold on the market (with an average particle diameter of 25 µm) was used and conditions for sintering were the same as in the example described above with the exception of a sintering temperature of 800° C.)

The void ratios were measured at 5 points (A to E) on a surface of fabricated porous plate. The measuring points were 5 points on a diagonal drawn between opposed vertices of a square with one side of 200 mm with which points together with both vertices the diagonal is divided into 6 segments equal in length to one another. The void ratios were obtained in a procedure in which thickness values, areas and mass values were measured on five square samples, each in the shape of a square with one side of 20 mm, and having measuring points at respective centers thereof to thereby obtain apparent densities and to further calculate the void ratios according to the following expression. In Table 6, there are shown the void ratios at respective measuring points, average values and standard deviations thereof.

Void ratio (%)=(1−an apparent density/a true density of titanium)×100

TABLE 6

| | Void ratios (%) | | | | | | |
|---|---|---|---|---|---|---|---|
| | A | B | C | D | E | Averages | Standard deviations |
| Example 1 | 42 | 41 | 43 | 40 | 41 | 41 | 1 |
| Example 2 | 43 | 39 | 46 | 42 | 46 | 43 | 3 |
| Comparative Example 1 | 41 | 53 | 39 | 60 | 36 | 46 | 10 |

As is understood from Table 6, spherical gas atomized titanium powder is used, thereby enabling fabrication of a porous plate even with a thickness as thin as 2 mm or less in plate thickness and with uniform void ratios.

A similar shape was tried to obtain by means of HIP using the powder used in Comparative example 1. Since when HIP was used, a porous plate was not able to be separated from a capsule made of tantalum without breaking the plate, it was impossible to fabricate a porous plate in the shape of a square with one side of 200 mm and a thickness of 2 mm. The minimum thickness of a porous plate that can be fabricated by means of HIP was a thickness of 5 mm in a porous plate in the shape of a square with one side of 200 mm (wherein T/S=1/8000).

While a sintered compact in a similar shape was tried to fabricate by sintering a preform after molding the powder used in Comparative example 1 with a die press, the preform is excessively thin, so it is broken after pressing and the process was not able to enter even into a sintering step. The minimum thickness that can be fabricated according to the die press is a thickness of 5 mm in a porous plate in the shape of a square with one side of 200 mm (wherein T/S=1/8000).

INDUSTRIAL APPLICABILITY

As described above, a titanium powder sintered compact of the present invention can be provided as a titanium sintered filter with a maximum pore diameter of 70 µm or less, small in pressure drop and excellent in filtration performance while maintaining an average particle diameter and a void ratio of a preform of raw material spherical powder.

A titanium powder sintered compact of the present invention can be provided with a high bending characteristic as far as spherical gas atomized titanium powder is used and a plate thickness is restricted to 500 µm or less; therefore, there can be fabricated with the titanium powder sintered compact: for example, filter elements in a three-dimensional shape, such as a cylinder and a corrugated plate, a dispersion element and the like at a low cost without using CIP.

A cylindrical porous compact even with a large height of the present invention can also be fabricated without applying a pressure and uniformity in quality in the height direction is excellent despite no application of a pressure. Therefore, high quality cylindrical titanium powder sintered filters with various sizes can be economically fabricated. Furthermore, excellent reverse-washing reproducibility can be imparted to the filters.

Since a highly corrosion resistant metal sintered filter of the present invention is fabricated with titanium powder, the filter is very excellent in corrosion resistance. Furthermore, since in a highly corrosion resistant metal sintered filter of the present invention, a cavity diameter stepwise increases from one surface to the other surface, sizes of cavities in each layers are uniform and shapes of cavities each are formed with a smooth curved surface; therefore, the sintered filter is excellent in reverse-washing reproducibility. In addition, since a void ratio can be made constant between one surface and the other surface, an adverse influence on a liquid permeability can be avoided. Since a fabrication process is simple, a fabrication cost can be restricted to a low value.

Moreover, since a porous conductive plate of the present invention is made of a sintered compact of spherical gas atomized titanium powder, which makes itself excellent in moldability, a thin, large area product can be fabricated with simplicity. Besides, since a surface smoothness is excellent even without coating such as plasma spraying, a protectability for and contactability with a thin film electrode laminates can be improved without accompanying increase in electrical resistance, causing economy to be also excellent. With such advantages, there can be provided a powder feeder and a current collector, both with a high performance at a low cost.

Besides, a highly corrosion resistant porous plate of the present invention can be economically fabricated as a plate too thin to be fabricated with HIP, even without pressing and, furthermore, uniformity in void ratio can be even higher than a product by means of pressing. Therefore, thin porous plates uniform in void ratio can be fabricated at a very low cost to therefore, economically provide a high quality product applicable to, for example, an ink dispersion plate for use in an ink jet printer.

What is claimed is:

1. A highly corrosion resistant metal filter made of a plate-like porous compact, obtained by filling a vessel with and sintering a spherical, gas atomized titanium powder that is free from binder and having an average diameter in the range of from 10 to 150 μm,
   wherein the filter has a cavity diameter that increases stepwise from one surface of the porous compact to the other surface thereof;
   wherein said cavity diameter is in the range of from 3 to 70 μm; and
   wherein the filter has a void ratio in the range of from 35 to 55%.

2. The highly corrosion resistant metal filter according to claim 1, having a void ratio that is almost constant between one surface of said porous compact and the other surface thereof.

3. The highly corrosion resistant metal filter according to claim 1, fabricated by filling the vessel without applying a pressure and sintering without applying a pressure.

* * * * *